May 27, 1952     H. W. SLATER     2,597,958
THREE LEG DERRICK CONSTRUCTION

Filed Aug. 26, 1946     6 Sheets-Sheet 1

H. W. SLATER
*INVENTOR.*

BY Lester B. Clark
&Ray L. Smith

ATTORNEYS

May 27, 1952 H. W. SLATER 2,597,958
THREE LEG DERRICK CONSTRUCTION
Filed Aug. 26, 1946 6 Sheets-Sheet 2

H. W. SLATER
INVENTOR.
BY Lester B. Clark
& Ray L. Smith
ATTORNEYS

May 27, 1952 — H. W. SLATER — 2,597,958
THREE LEG DERRICK CONSTRUCTION
Filed Aug. 26, 1946 — 6 Sheets-Sheet 4

H. W. SLATER
INVENTOR.

BY Lester B. Clark
& Ray L. Smith
ATTORNEYS

May 27, 1952  H. W. SLATER  2,597,958
THREE LEG DERRICK CONSTRUCTION
Filed Aug. 26, 1946  6 Sheets-Sheet 5

H.W. SLATER
Inventor
Lester B. Clark
& Ray L. Smith
By
Attorneys

May 27, 1952  H. W. SLATER  2,597,958
THREE LEG DERRICK CONSTRUCTION
Filed Aug. 26, 1946  6 Sheets-Sheet 6

H. W. SLATER
Inventor

Lester B. Clark
& Ray L. Smith
By
Attorneys

Patented May 27, 1952

2,597,958

UNITED STATES PATENT OFFICE 2,597,958

THREE LEG DERRICK CONSTRUCTION

Henry W. Slater, Victoria, Tex.

Application August 26, 1946, Serial No. 693,039

2 Claims. (Cl. 189—11)

The invention relates to a portable drilling rig and particularly one which embodies a minimum of equipment to be transported.

In the drilling of wells by the rotary method, and in the servicing of wells, it is necessary to have a derrick to support the crown block so as to manipulate the drill pipe, casing, and tubing.

Various types of portable rigs have been heretofore devised, but the majority of them have embodied either two or four legs to make up the derrick. The two leg portable derricks have been found to be quite unstable, particularly where any substantial load of pipe is to be handled or where a substantial pull is to be applied to the equipment or apparatus in the well bore. On the other hand, while the four leg derrick is satisfactory, it is cumbersome to transport, embodies considerable equipment and a great deal of time to make up and tear down.

The present invention contemplates a three leg portable derrick where one leg comprises a main mast which carries a crown block, double board and other equipment in such a manner that the two remaining legs may act primarily as braces in supporting the main mast.

It is one of the objects of the invention to provide a portable derrick having a main mast which is extensible and collapsible and to which a secondary pair of legs may be affixed.

Another object of the invention is to provide a mast for three leg portable derricks wherein the crown block and double board are connected thereto.

Another object of the invention is to provide a portable derrick having a telescoping main mast to which ladder sections are affixed in a manner to permit telescoping of the ladder sections at the same time the mast section is telescoped.

Another object of the invention is to affix a crown block and a run-around to the top of a main mast of a portable derrick.

Still another object of the invention is to utilize one of the hollow pipe legs of a portable derrick as a stand pipe for the drilling mud.

Still another object of the invention is to provide a telescoping mast for portable derricks wherein the double board is pivoted thereon so as to be moved to horizontal position and connected to secondary legs to brace the construction.

Still another object of the invention is to provide a crown block fixed to the top of an extensible mast of a portable derrick so that a pair of secondary legs may be affixed thereto to brace the main mast.

Another object of the invention is to provide a double board pivoted to the main mast of a portable derrick and which may be pivoted to horizontal position and attached to a pair of secondary legs.

Still another object of the invention is to provide a main mast for a portable derrick which can be telescoped and then tilted over to a traveling position upon a vehicle.

Other and further objects of the invention will be readily apparent when the following description is considered in connection with the accompanying drawings, wherein—

Figure 1:
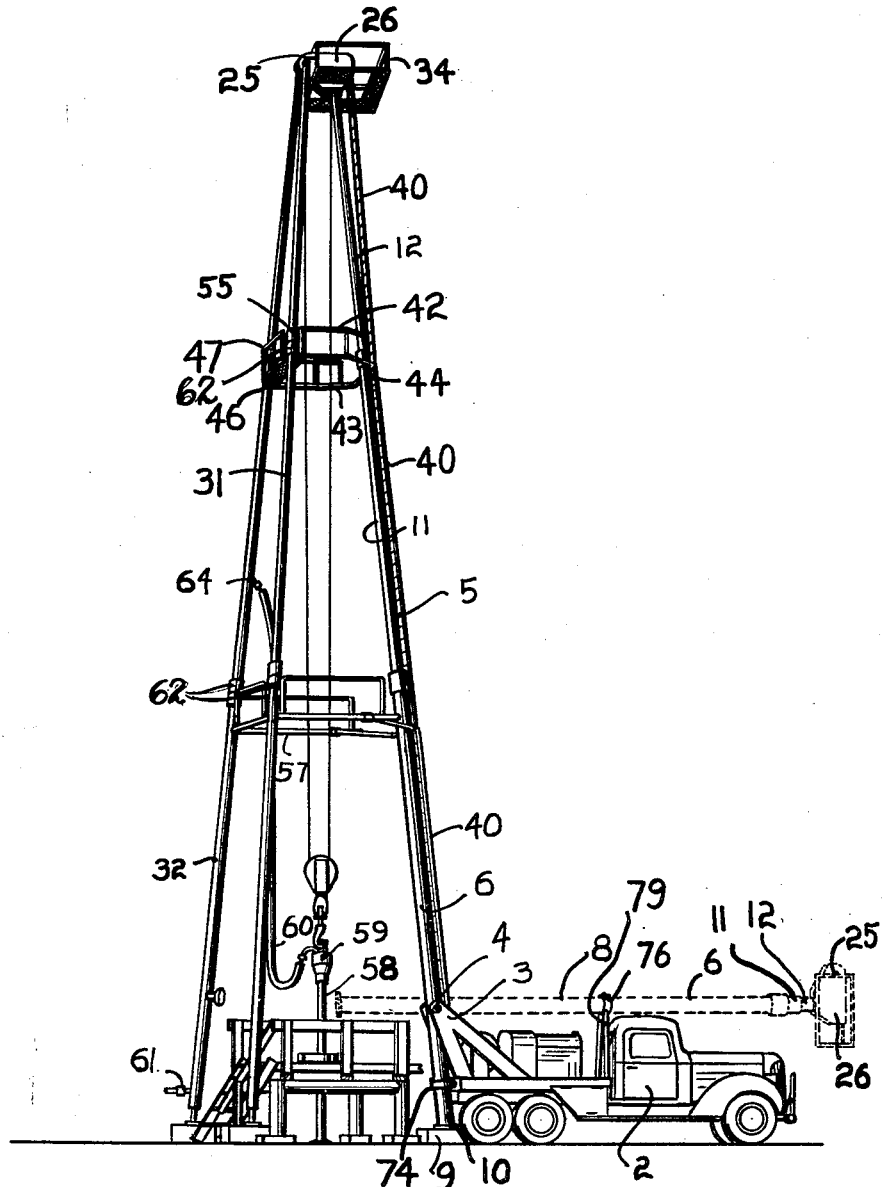
Fig. 1 is a diagrammatic arrangement illustrating a derrick in operating position.
Figure 2:
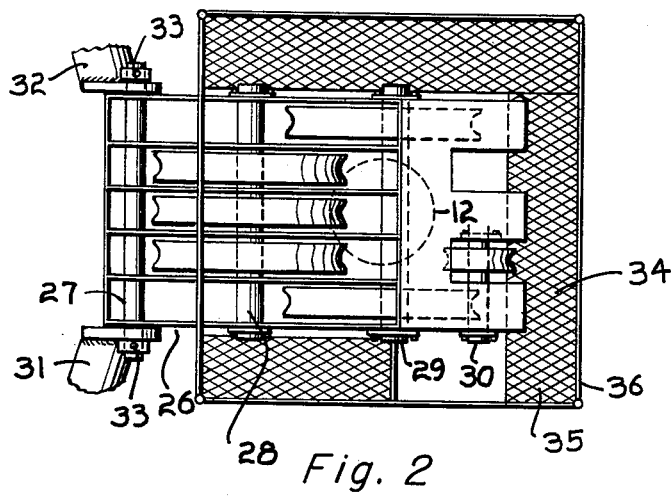
Fig. 2 is a top plan view looking down on the crown block and run-around frame or brace thereabout.

In Figure 1 a vehicle 2 of suitable construction serves to transport the main portion of the derrick. This truck is provided with a pair of braces or trunnions 3 having the pivot 4 therein. The main mast is indicated generally at 5 and is shown in Fig. 1 in extended position. The lower section 6 thereof is affixed to the pivot 4 so that this section may be tilted to the dotted line position at 8. A foundation block 9 may be inserted under the foot 10 of the mast to rigidly support the load applied to the mast and to relieve the vehicle thereof.

Telescopically arranged relative to the lower section 6 of the mast is the intermediate section 11 and the upper section 12. All of these sections are made up of pipe and are of such size that they may be telescoped one within the other.

Figure 8:
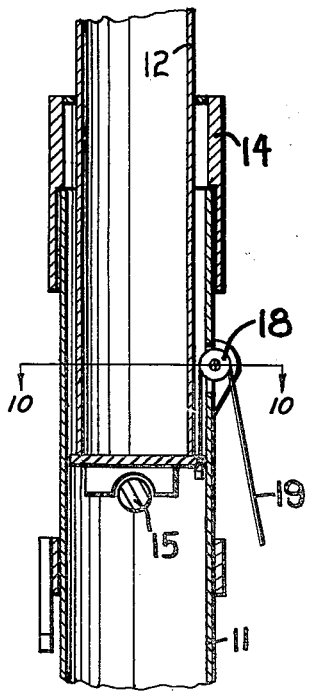
Fig. 8 is a broken vertical sectional view of the telescoping arrangement for one of the sections of the main mast.
Figure 9:
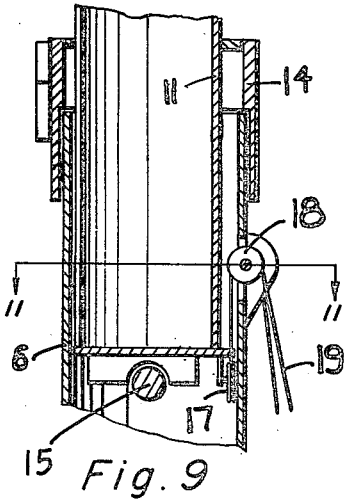
Fig. 9 is a vertical sectional view of one of the telescoping connections of the lower portion of the main mast.

In order to effect the telescoping movement of these sections, Figs. 8 through 12 illustrate the arrangement of structure and as seen in Fig. 9 the lower section 6 of the mast 5 is of a size to receive the intermediate section 11. A cap or closure 14 is arranged over the upper end of the section 6 so as to guide the section 11. A support or cross rod 15 through the section 6 serves to support the intermediate section 11. Removal of this bar will allow telescoping of the sections.

The lower end of the section 11, as best seen in Fig. 9, carries a pulley 17 and a somewhat similar pulley 18 is mounted on the mast section 6. A cable or flexible member 19 passing over these pulleys will serve to extend or permit collapsing of the adjacent section.

Fig. 8 shows a similar arrangement for the upper section 12 of the main mast relative to the intermediate section 11.

Figure 10:
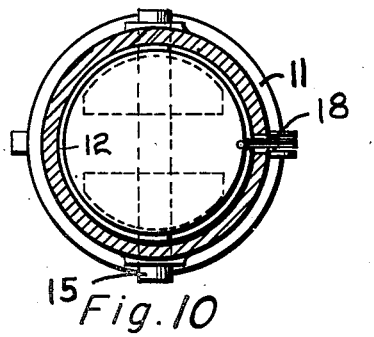
Fig. 10 is a section taken on the line 10—10 of Fig. 8.

Fig. 10 is a transverse section illustrating the pulley 18 and the pipe section therein which is being telescoped.

Figure 12:
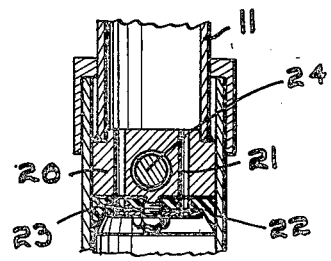
Fig. 12 is a broken detail sectional view of a modified form of the main mast wherein the sections are telescoped by hydraulic pressure.
Figure 11:
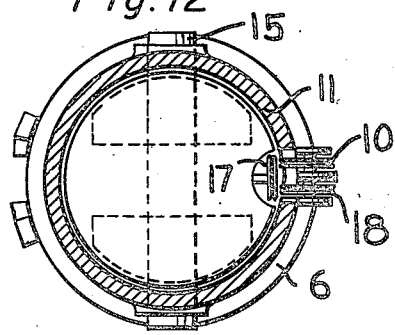
Fig. 11 is a section taken on the line 11—11 of Fig. 9.

Fig. 12 is a modified form of the arrangement wherein the pulleys and cable have been omitted and a piston head 20 affixed on the lower end of the pipe section 11 or 12 has been substituted therefor. This piston 20 has small ports 21 therein and a sealing member 22 which has small orifices or ports 23 therein communicating with ports 21. This piston forms a seal inside of the base section 6 and it is therefore possible to apply liquid pressure in the base section beneath this piston in such a volume that it will raise the intermediate section so that it may be caught and pinned with the cross bar 24. Liquid leaking through the passages 21 will move into the intermediate section 11 and be exerted against a similar piston on the lower end of the upper section 12.

Figure 3:
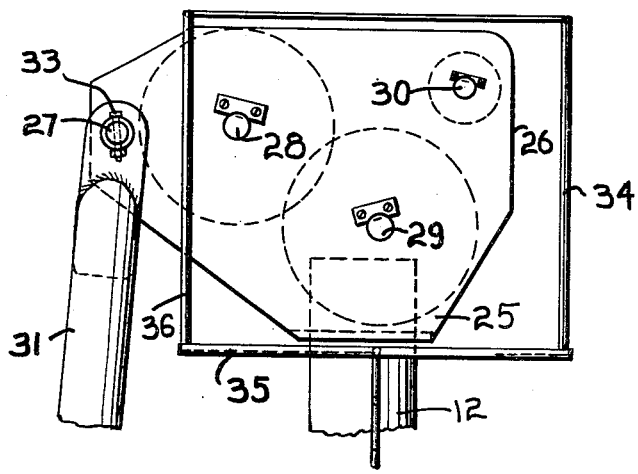
Fig. 3 is a side elevation of the crown block, top of the main mast, and the connection of the supporting legs thereto.

Fig. 3 shows the top of the mast 5 and illustrates the upper section 12 thereof as having a crown block 25 affixed thereon. This crown block is in the form of a plurality of spaced plates 26 carrying the cross pins 27, 28, 29 and 30. Various wheels and pulleys are supported by these cross pins for manipulation of the cable and the cross pin 27 is arranged to have the legs 31 and 32 separably connected at 33 on the opposite ends of such pin so that they will be firmly positioned to serve as braces for the main mast. The frame work 34 is generally known as a runaround and has the flooring 35 and the railing 36. This run-around is also affixed to the crown block and the main mast. Each of the mast sections 6 and 11 and 12 have a length of ladder 40 affixed thereof. These ladder sections are of decreasing size on each mast section so that as the mast sections telescope, the ladders will telescope each into the next larger section.

As will be seen in Fig. 1 legs 31 and 32 are each constructed of a plurality of pipe sections which are separably coupled together by means of suitable couplings 62, the several sections of each leg being substantially equal in length to the corresponding main mast sections. This sectional construction, together with the connections 33 for separably connecting the legs to the crown block, permit the legs to be removed when the derrick is to be lowered and to be attached when the mast is erected. By this sectional construction the legs may also be adjusted in length to correspond to whatever height the mast may be extended in operation in order to effectively brace the latter and complete the derrick when erected. When the derrick is to be lowered, the legs 31 and 32 are disconnected from the crown block and may be broken down in their several sections for storage on the truck during transportation.

Supported also on the main mast and particularly on the upper end of the intermediate section 11 is the double board 42. This board is seen in plan view in Fig. 4 and is made up of a frame 43 which is pivoted on a shaft 44 inserted into a tubular bracket 45 affixed to the mast section 11. The connection of frame 43 to shaft 44 is separable so that the double board may be removed from the main mast preparatory to lowering and transporting the structure.

The double board is provided with a flooring 46, railing 47 and the pipe-racking rods 48. These rods serve to receive the sections of drill pipe shown in dotted lines at 49 so as to hold them in place as they are withdrawn from the well.

Figure 5:
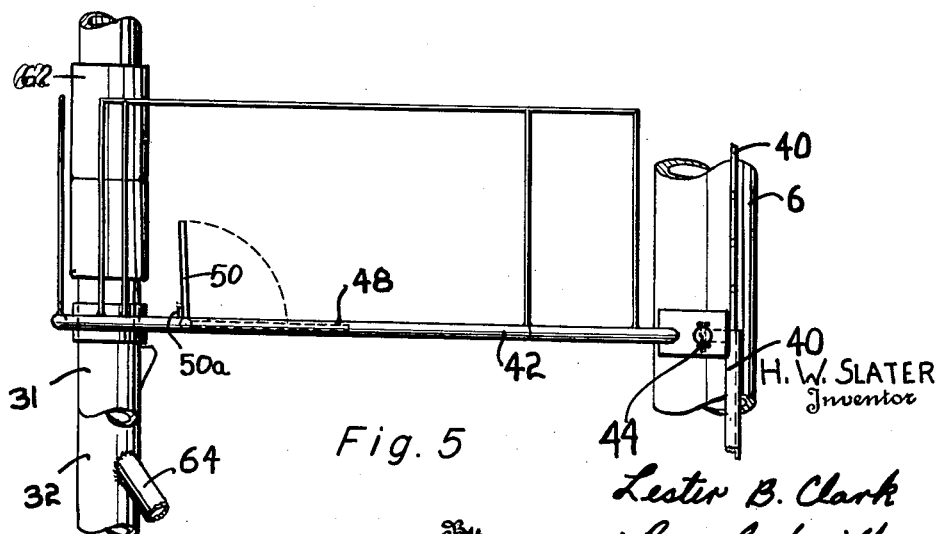
Fig. 5 is a side elevation of the main mast, the secondary legs, and the double board.
Figure 6:
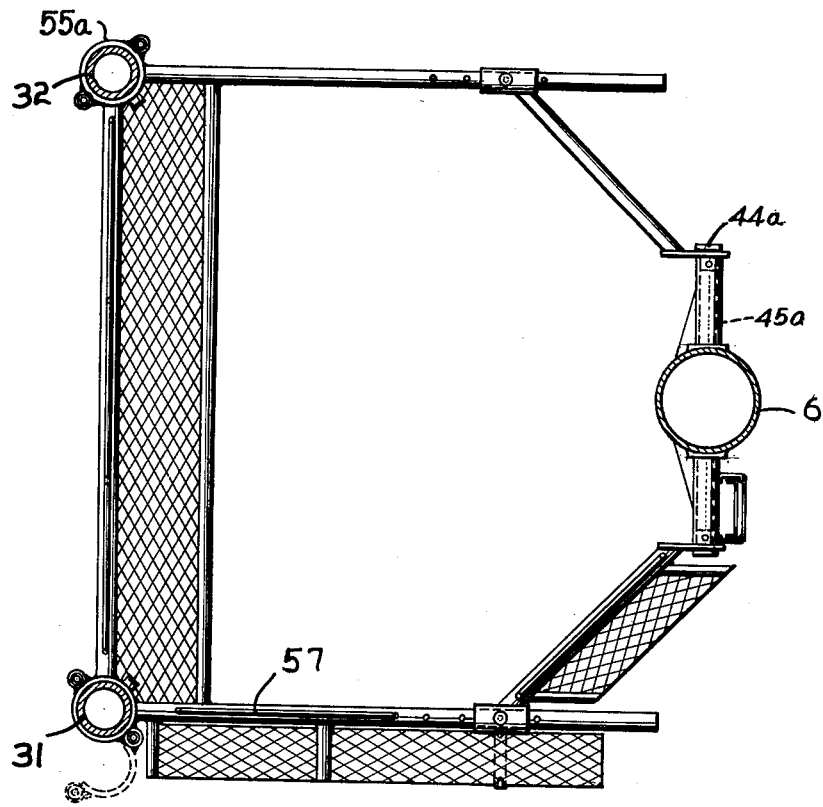
Fig. 6 is a plan view looking down on the brace frame which is supported in the derrick below the double board.
Figure 7:
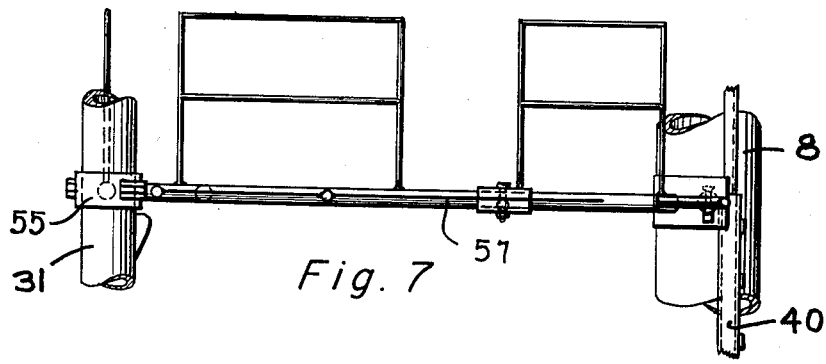
Fig. 7 is a side elevation of the brace frame.

A floor plate 50 is hinged at 50a to the frame and has the recesses 51 therein to receive the pipe as it is pulled over by the derrick man. This floor 50 may tilt upwardly, as indicated in Fig. 5, if a coupling should be hooked underneath it.

Figure 4:
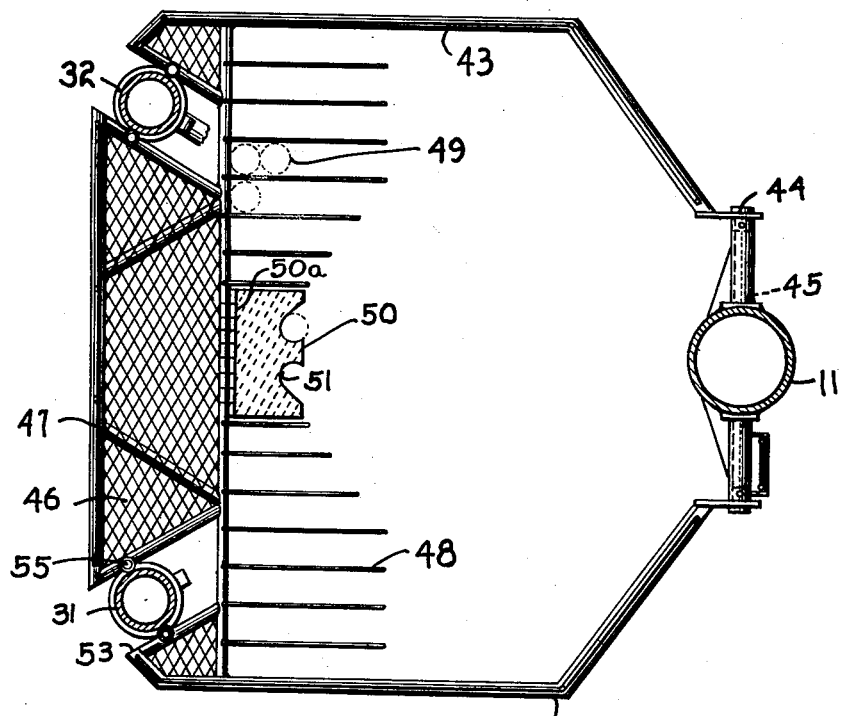
Fig. 4 is a transverse section through the main mast and looking down on the double board as it is supported in operating position.

In order to support the double board as seen in Fig. 4 the frame 43 has the slots 53 therein which fit about the derrick legs 31 and 32 respectively and may be suitably clamped in position on legs 31 and 32 by the clamps 55. In order to remove the double board from the derrick preparatory to lowering the mast for transportation, the clamps 55 are released and frame 43 disconnected from shaft 44.

Below the double board on the main mast is the brace frame 57 which can be removably affixed by suitable clamps 55a to the legs 31 and 32 and by a bracket 45a and a shaft 44a to the main mast, this arrangement being quite similar in form and construction to the corresponding connections of double board 42.

Both double board 42 and brace frame 57 will be removed from the derrick structure when the structure is to be lowered for transportation.

Figures 15, 16, 17:
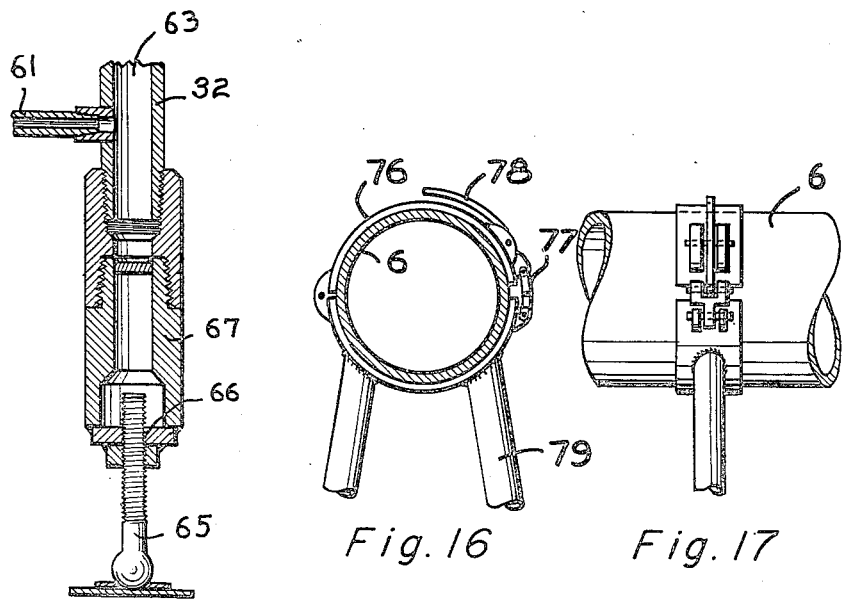
Fig. 15 shows the end of one of the auxiliary legs and illustrates the manner of adjusting it to the level of the derrick and also illustrating the connection for the drilling mud so as to use the leg as a stand pipe.
Fig. 16 shows a boomer clamp for clamping the main mast on the vehicle in traveling position.
Fig. 17 shows a side view of the boomer clamp of Fig. 16.

A feature of the particular advantage in a portable derrick of this sort which saves considerable trouble in erecting and tearing down is the provision of a stand pipe which is embodied in the leg 32 as best seen in Fig. 1. In the rotary method of drilling, mud is circulated into and out of the well bore by suitable pumps and is introduced into the drill stem 58 through a swivel 59 by means of a hose 60. In view of the fact that the swivel must be raised and lowered during the operation, there must be considerable length of hose 60 available. In order to reduce this length of hose, a connection 61 for drilling fluid has been made in the leg 32 as best seen in Fig. 15. The leg is hollow to form a reservoir 63 and the drilling mud moves upwardly where it may discharge through the outlet 64 into the hose 60. This method eliminates a considerable length of hose, clamps, and equipment, and facilitates the operation.

In order to adjust the legs 31 and 32, each of them is provided with a foot-piece 65 threaded at 66 into the base of a coupling 67.

In actual operation, a derrick of the type herein described has actually operated to drill wells of considerable depth, to service wells, and to pull pipe from the wells in an efficient and economical manner. When the parts are telescoped and arranged as described, the parts are short enough for transport. To permit quick erection, the many separate pieces of equipment are dispensed with as one of the legs acts as a stand pipe, the ladders telescope with the mast sections, and the crown block, runaround and double board are all carried by the main mast.

Figure 13:
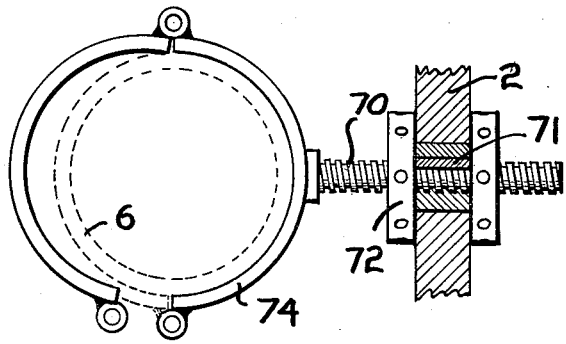
Fig. 13 is a transverse sectional view showing the clamping arrangement for affixing the main mast to the vehicle.
Figure 14:
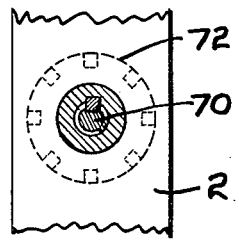
Fig. 14 is a sectional view illustrating the manner of adjustment of this clamp of Fig. 13.

When the derrick is to be erected, the vehicle 2 will back up to a position adjacent the location and by suitable block and tackle connection (not shown) to the lower section 6 of the main mast the lower end thereof will be drawn downwardly about the pivot 4 until the mast approaches a vertical position. The end of the vehicle 2 is seen in Fig. 13 as supporting a threaded spindle 70 threaded through a bushing 71. Adjusting spools 72 on the spindle can be turned to either extend or retract the shaft 70. This shaft carries a clamp 74 which can be pinned around the main mast 6 as seen in Fig. 1. Thus, when the mast is moved to substantially vertical position, the clamp will be extended and affixed around the mast. The vehicle can be properly anchored and then the spools 72 adjusted so as to tilt the main mast the desired amount so that the hoisting equipment will support the drill pipe and swivel directly over the location where the well is to be drilled, or the well itself where a well is to be serviced.

The foundation block 9 can then be positioned and it is by means of this adjustment that the mast is centered over the well.

When the main mast has been erected and positioned, as described, the brace legs 31 and 32 will be raised and their upper ends connected to pin 27 and positioned to form the desired tripod structure. Foot pieces 65 may then be adjusted to level the structure. The double board 42 will then be raised into the tripod derrick thus formed and frame 43 will first be pivotally connected to shaft 44 and then will be swung upwardly about the pivot thus formed until legs 31 and 32 are received in slots 53 and clamped therein by means of clamps 55. Double board 42 will thus serve as a transverse stiffening brace in the upper portion of the structure. Brace frame 57 will then be similarly connected to base section 6 and swung into horizontal position and connected to legs 31 and 32 by means of clamps 55a, thereby forming a second transverse stiffening brace for the lower portion of the derrick.

When the derrick is to be lowered, brace frame 57 and double board 42 will be removed. Legs 31 and 32 will be disconnected from crown block 26 and broken down into their component sections. Mast 5 will then be retracted and rotated to the position shown in broken lines at 8 in Fig. 1 in position for transportation by the truck. The legs 31 and 32 and double board 42 and brace frame 57 will be suitably stored in the truck and the derrick will thereby be ready for transportation to another location.

Figs. 16 and 17 show a clamp 76 having the linkage 77 and lever 78 whereby the main mast 5 will be clamped to the support frame 79 on the vehicle so as to anchor the mast in traveling position.

The main mast need not be fully extended for certain operations. Of course, in a drilling operation a rig of this type could handle doubles or at least two thirty foot lengths of drill pipe, but very often in servicing a well, that is, in pulling the tubing or casing or in reworking a well, only single lengths of pipe are handled. Under such conditions the main mast need not be fully extended. For instance, the section 12 need not be extended and the crown block would then be positioned at the top of the section 11. Or, if a tremendous pull were desired and a great deal of strength in the main mast found to be necessary, the section 11 need not be extended and the crown block would then be positioned at the elevation of the top of the section 6. The main mast could be tilted as desired. In view of the foregoing it seems obvious that the assembly adapts itself for various circumstances and conditions and eliminates a great deal of equipment now generally employed in connection with portable derricks of this sort.

What is claimed is:

1. A portable derrick, comprising, a truck, a trunnion thereon, a main mast, said mast including a plurality of coaxially arranged telescoping pipe sections, the lowermost one of said sections having pivotal connection to said trunnion for rotation thereon between horizontal and generally upright positions, means to extend said sections, a crown block fixedly mounted on the outer end of the uppermost one of said sections, a pair of tubular brace legs having their upper ends separably connected to said crown block and extending angularly therefrom to form with said mast a tripod structure, and a pair of longitudinally spaced brace frames extending transversely between said mast and said brace legs, each of said brace frames having separable means pivotally connecting one side thereof to said mast, and clamp means releasably connecting the other side thereof to both said brace legs.

2. A portable derrick, comprising, a truck, a trunnion thereon, a main mast, said mast including a plurality of coaxially arranged telescoping pipe sections, the lowermost one of said sections having pivotal connections at an intermediate point thereof to said trunnion for rotation between horizontal and generally upright positions, the lower end portion of said lowermost section extending beyond the end of said truck, clamping means connecting said truck to said lower portion when the mast is in erect position, said clamping means including adjusting elements for adjusting the angular position of said mast with respect to the vertical, means to extend said sections, a crown block fixedly mounted on the outer end of the uppermost one of said sections, a pair of tubular brace legs having their upper ends separably connected to said crown block and extending angularly therefrom to form with said mast a tripod structure, and a pair of longitudinally spaced brace frames extending transversely between said mast and said brace legs, each of said brace frames having separable means pivotally connecting one side thereof to said mast, and clamp means releasably connecting the other side thereof to both said brace legs.

HENRY W. SLATER.

REFERENCES CITED

The following references are of record in the file of this patent:

UNITED STATES PATENTS

| Number | Name | Date |
|---|---|---|
| 1,584,611 | Clark | May 11, 1926 |
| 1,770,845 | Crosthwait | July 15, 1930 |
| 1,796,469 | Merritt | Mar. 17, 1931 |
| 2,128,712 | Neff | Aug. 30, 1938 |
| 2,204,713 | White, Jr. | June 18, 1940 |
| 2,293,958 | Woolslayer et al. | Aug. 25, 1942 |
| 2,345,253 | Funk | Mar. 28, 1944 |
| 2,386,494 | Nagle | Oct. 9, 1945 |